Oct. 28, 1924.
J. H. HAMMOND, JR
1,513,707
TRANSMISSION AND RECEIVING SYSTEM
Original Filed Aug. 5, 1919    2 Sheets-Sheet 2
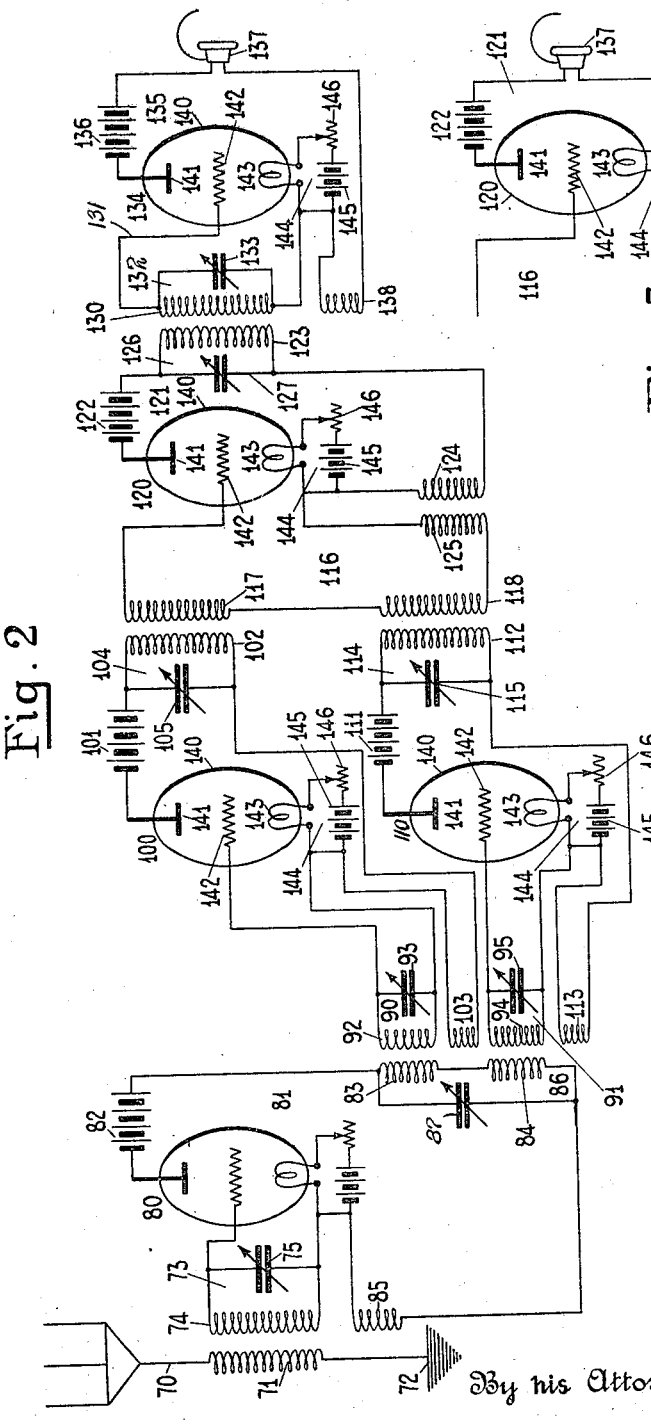
Inventor
JOHN HAYS HAMMOND JR
By his Attorney Patented Oct. 28, 1924.

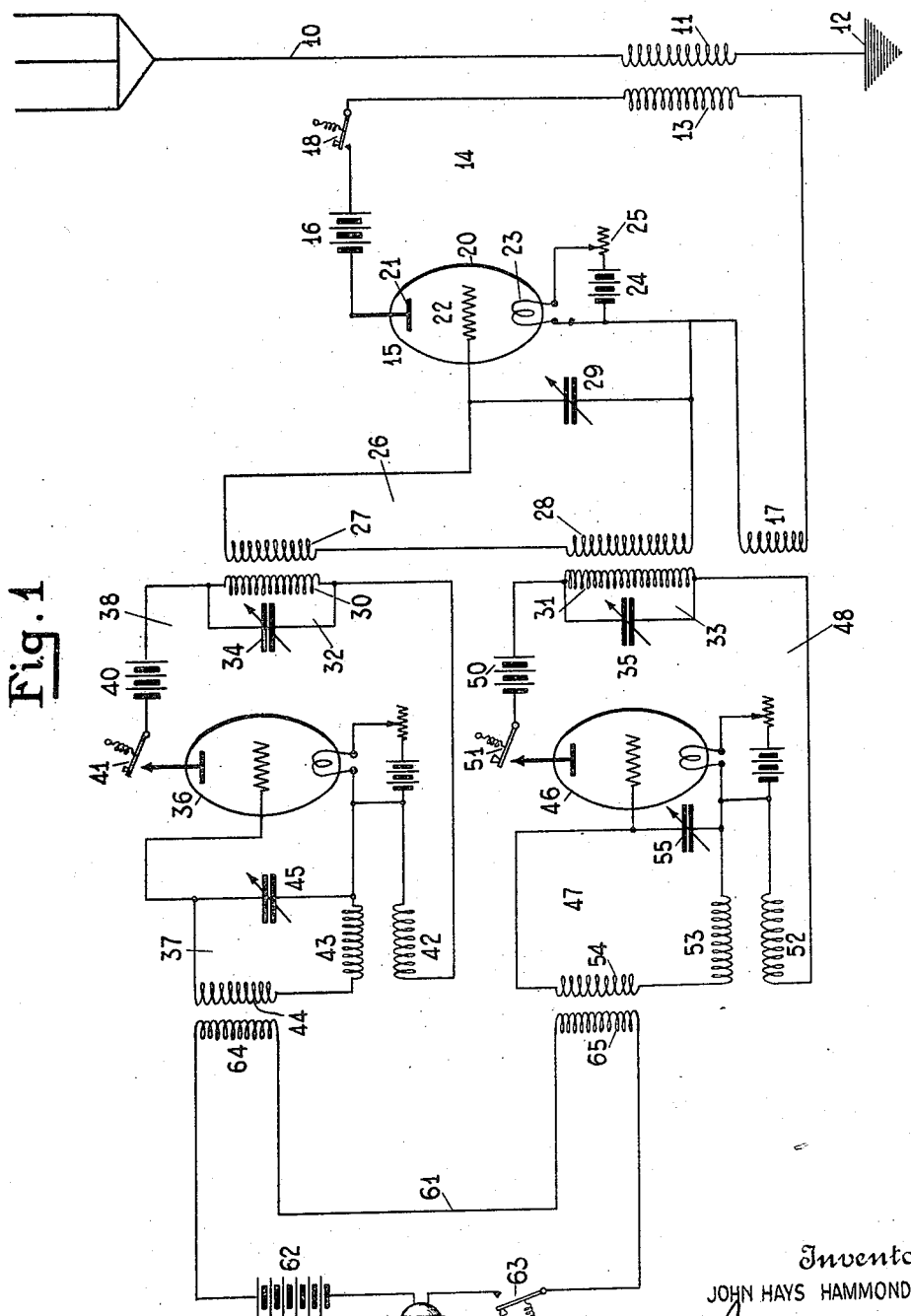

1,513,707

UNITED STATES PATENT OFFICE.

JOHN HAYS HAMMOND, JR., OF GLOUCESTER, MASSACHUSETTS.

TRANSMISSION AND RECEIVING SYSTEM.

Original application filed August 5, 1919, Serial No. 315,463. Renewed January 25, 1923. Patent No. 1,472,218, dated October 30, 1923. Divided and this application filed July 21, 1923. Serial No. 652,900.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Transmission and Receiving Systems, of which the following is a specification, this application being a division of my application, Ser. No. 315,463, filed Aug. 5, 1919, and renewed Jan. 25, 1923.

Some of the objects of the present invention are to provide a method and apparatus for transmitting and receiving messages; to provide means for impressing upon a series of emitted waves a plurality of series of periodic variations or modifications of different frequencies respectively and impressing on said waves and variations a series of irregular modifications corresponding to a message; to provide means for selecting from a series of received waves a predetermined series of periodic variations; to provide means for transmitting and receiving telephonic and telegraphic messages through the medium of irregular modifications impressed upon a plurality of series of periodic variations of different frequencies respectively; and to provide other improvements as will hereinafter appear.

In the accompanying drawings, Fig. 1 represents diagrammatically one form of transmitting apparatus embodying the present invention; Fig. 2 represents diagrammatically one form of receiving apparatus embodying the present invention; and Fig. 3 represents a fragmentary portion of the receiving apparatus employed when the system of the invention is used in connection with telephony.

Referring to the drawings, the transmitting apparatus shown in Fig. 1 comprises an open, aerial circuit 10, having a secondary inductance 11 grounded at 12, the said circuit 10 constituting the medium for transmitting radiant energy waves into space to be received by an apparatus to be hereinafter described.

For causing the aerial circuit 10 to emit waves of radiant energy of a suitable high frequency, the secondary coil 11 of the aerial circuit 10 is inductively coupled to a primary coil 13 located in a closed circuit 14 controlled by an autodyne or thermionic oscillator 15. The circuit 14 includes a battery 16, a tickler coil 17 and for starting purposes a key 18. The oscillator 15 may be of any suitable construction, as shown, consists of an evacuated bulb 20 having enclosed therein a plate terminal 21, a grid 22 and a filament 23 arranged to be heated by a local circuit including a battery 24 and a rheostat 25. The oscillator 15 is arranged to be controlled by a closed circuit 26 including two secondary coils 27 and 28 and a variable condenser 29, the function of said circuit 26 being to react under the influence of the tickling coil 17 when the key 18 is closed. This reaction causes tube 15 to oscillate and acting through coils 13 and 11 causes the aerial circuit 10 in a well known manner to emit radiant waves of a high frequency, for example, 1,000,000 cycles per second.

In order to impress upon the high frequency waves emitted by the aerial circuit 10 periodic variations in amplitude the secondary coils 27 and 28 are inductively coupled respectively to two primary coils 30 and 31, the former being included in a closed oscillatory circuit 32 tuned to a frequency of, for example, 50,000 cycles per second and the latter being included in a closed, oscillatory circuit 33 tuned to a frequency of, for example, 35,000 cycles per second. Variable condensers 34 and 35 are respectively included in the circuits 32 and 33, and the tuning of the circuits is adjusted according as the system is used for telephony or telegraphy. If the former a frequency above audibility is employed, and if the latter a frequency within audibility is employed.

Oscillations of the desired secondary frequency of, for example, 50,000 cycles per second are produced in the circuit 32 by an autodyne or thermionic oscillator 36 arranged to be controlled by an oscillatory circuit 37 and controlling a circuit 38 including the oscillatory circuit 32. The circuit 38 also includes a battery 40, or other source of current, a control key 41, and a tickler coil 42 arranged in operative relation to a coil 43 in the oscillatory circuit 37. The circuit 37 also includes a secondary coil 44 and a variable condenser 45, all connected to control the oscillator 36 in a well known manner.

Oscillations of the desired secondary frequency of, for example, 35,000 cycles per second are produced in the circuit 33 by an autodyne or thermionic oscillator 46 arranged to be controlled by an oscillatory circuit 47 and controlling a circuit 48 including the oscillatory circuit 33. The circuit 48 also includes a battery 50, or other source of unidirectional current, a control key 51, and a tickler coil 52 arranged in operative relation to a coil 53 in the oscillatory circuit 47. The circuit 47 also includes a secondary coil 54 and a variable condenser 55 all connected to control the oscillator 46 in a well known manner.

For impressing upon the periodically modified radiant waves emitted by the aerial circuit amplitude variations corresponding to sound waves to form a telephonic message, a telephone transmitter 60 is arranged in a circuit 61 including a battery 62 and a key 63, the last named serving to maintain the circuit 61 open when signals or messages are not to be transmitted. This circuit 61 also includes two primary coils 64 and 65 which are inductively coupled respectively to the secondary coils 44 and 54 of the circuits 37 and 47.

When the above described transmitting system is employed solely for telegraphic communication, either wireless or by wire, the circuit 61 is omitted, and the tuning of the circuits 37 and 47 is such as to produce beats within audibility. Thus the circuit 37 may be tuned to a frequency of 30,000 cycles per second and the circuit 47 tuned to a frequency of 29,000 cycles per second, thereby giving a beat frequency of 1,000 cycles per second which is within audibility. A telegraphic message may be sent by use of any one of the keys 18, 41 or 51.

For receiving the waves or impulses emitted from the transmitting system of Fig. 1, one form of receiving system is shown in Fig. 2, comprising an open, aerial circuit 70 having a primary inductance 71 and grounded at 72. This aerial circuit 70, 71 and 72 is inductively coupled through its primary coil 71 with a closed, oscillatory circuit 73 including a secondary coil 74 and a variable condenser 75. This circuit 73 is tuned to the natural period of vibration of the aerial circuit 70, 71 and 72, here 1,000,000 cycles per second, and is arranged to control a thermionic valve or detector 80.

The detector 80 is arranged to control a circuit 81 including a battery 82, two primary coils 83 and 84 and a tickler coil 85, the latter being located with respect to the secondary coil 74 to give the desired sensitiveness. The primary coils 83 and 84 are included in a closed, oscillatory circuit 86 having a variable condenser 87 and being tuned to the aforesaid frequency of 1,000,000 cycles per second.

For the purpose of selecting the desired secondary frequencies, the circuit 86 is inductively coupled through its primary coils 83 and 84 to two oscillatory circuits 90 and 91, the one including a secondary coil 92 and a variable condenser 93, and the other including a secondary coil 94 and a variable condenser 95. The oscillatory circuit 90 is tuned to the frequency of one of the incoming secondary frequencies, for example, 50,000 cycles per second, and is arranged to control a thermionic valve or detector 100 which controls a circuit including a battery 101, a primary coil 102 and a tickler coil 103. The primary coil 102 is included in an oscillatory circuit 104 having a variable condenser 105 and being tuned to the secondary frequency of 50,000 cycles per second. The oscillatory circuit 91 is tuned to the other incoming secondary frequency of 35,000 cycles per second, and is arranged to control a thermionic valve or detector 110, which in turn controls a circuit including a battery 111, a primary coil 112 and a tickler coil 113. The primary coil 112 is included in an oscillatory circuit 114 having a variable condenser 115 and being tuned to the secondary frequency of 35,000 cycles per second.

For causing the two series of selected periodic variations to produce beats, the two oscillatory circuits 104 and 114 are inductively coupled to a common untuned circuit 116 including two secondary coils 117 and 118 arranged in operative relation respectively to the two primary coils 102 and 112. This circuit 116 is arranged to control a thermionic amplifier or detector 120, the output circuit 121 of which includes a battery 122, a primary coil 123 and a tickler coil 124. The coil 124 is coupled to a coil 125 in the circuit 116 in a manner to give the desired sensitive action. The primary coil 123 is included in an oscillatory circuit 126 tuned to the beat frequency of 15,000 per second for telephony and 1,000 cycles per second for telegraphy and including a variable condenser 127.

For amplifying the beat frequency of the circuit 126 the primary coil 123 is inductively coupled to a secondary coil 130 in a circuit 131 which also includes an oscillatory circuit 132 having a variable condenser 133. The circuit 131 is arranged to control an amplifier or detector 134 which in turn controls a receiving circuit 135 comprising a battery 136, a suitable receiving instrument 137 and a tickler coil 138, the latter being suitably located with respect to the oscillating circuit 132 to give the required sensitive action.

In the foregoing the thermionic valves and oscillators 80, 100, 110, 120 and 134 have been identified generally and may be of any suitable type, but as here shown each, preferably, consists of an evacuated glass bulb 140 having sealed therein a plate electrode 141, a grid 142 and a filament 143, this latter element being contained in and heated by a local circuit 144 having a battery 145 and an adjustable resistance 146. In Fig. 3 the controlled circuit 121 includes the receiving instrument 137, and the connected amplifying circuits are dispensed with. This arrangement is employed where amplification of the received signals is unnecessary.

Having thus fully described this invention, I claim:

1. A method of transmitting and receiving energy which consists in generating a series of impulses having impressed therein a plurality of series of modifications of different frequencies respectively, receiving some of the energy of said impulses and modifications and causing the same to cooperate in producing a wave having a frequency determined solely by said first-mentioned frequencies.

2. A method of transmitting and receiving energy which consists in generating a series of impulses having impressed therein a plurality of series of periodic modifications of different frequencies respectively, receiving some of the energy of said impulses and modifications and causing the same to cooperate in producing a tone having a frequency within the limits of audibility and controlled solely by the frequencies of said modifications.

3. A method of transmitting and receiving energy which consists in generating a series of impulses having a frequency above audibility and having impressed therein two series of periodic variations having frequencies above audibility and differing from each other by a clearly audible frequency, receiving some of the energy of said impulses and producing as a result of the action of said variations a current having a frequency equal to the difference between the frequencies of said variations.

4. A method of signaling which consists in generating a series of waves modulated simultaneously by a plurality of series of variations having different frequencies respectively, receiving some of the energy of said waves and variations, producing therefrom a plurality of series of oscillations having frequencies corresponding to said first-mentioned frequencies respectively, and causing said oscillations to cooperate simultaneously in producing a current modified at a frequency determined solely by said first-mentioned frequencies.

5. A method of signaling which consists in transmitting a series of waves modulated simultaneously by two series of variations having different frequencies respectively, receiving some of the energy of said waves, producing therefrom two series of oscillations having frequencies corresponding to said first-mentioned frequencies respectively, and causing said two series of oscillations to cooperate simultaneously in producing a tone having a frequency controlled solely by said first-mentioned frequencies.

6. A method of signaling which consists in transmitting waves varied by two series of modulations having different frequencies respectively and differing in frequency by a frequency within the limits of audibility, receiving some of the energy of said waves and producing therefrom electric beats having a frequency corresponding to the difference between said first-mentioned frequencies.

7. A method of signaling which consists in transmitting a series of waves having a frequency outside of the range of audibility and having simultaneously impressed therein two series of modulations of different frequencies respectively, receiving said waves and modulations, producing therefrom impulses caused by the simultaneous action of said modulations and having a frequency equal to the difference between the frequencies of said modulations, and varying one of said series of modulations to form signals.

8. A method of signaling which consists in transmitting a series of waves having a frequency outside of the range of audibility and having simultaneously impressed therein two series of modulations of different frequencies respectively, the difference between said different frequencies being a frequency within the range of audibility, receiving said waves and modulations, producing therefrom impulses caused by the simultaneous action of said modulations and having a frequency equal to the difference between the frequencies of said modulations, and varying one of said series of modulations to form signals.

9. A method of signaling which consists in transmiting a series of waves having impressed therein a plurality of series of periodic variations having different frequencies respectively, receiving some of the energy of said waves and variations, causing the same to produce a wave having a frequency determined solely by said variations and modifying one only of said plurality of series of variations to produce signals.

10. In a system for receiving a series of waves having impressed therein two series of periodic variations differing in frequency one from the other by a clearly audible frequency, a circuit responsive to the series of waves, two circuits controlled by said first-mentioned circuit and tuned to respond respectively to said two series of variations, a circuit controlled by the joint action of said two circuits and a detector controlled by said last mentioned circuit.

11. In a system of signaling, the combination with means for generating a series of waves having impressed therein two series of periodic variations differing in frequency one from the other by a clearly audible frequency, of means for receiving said waves and variations including a circuit responsive thereto, two circuits controlled by said first mentioned circuit and tuned to respond respectively to currents of the frequencies of said two series of variations, a circuit controlled by the joint action of said two circuits, a detector controlled by said last mentioned circuit, and a circuit controlled by said detector and tuned to said clearly audible frequency.

12. In a system of signaling the combination with means for generating a series of waves having impressed therein two series of periodic variations differing in frequency by a clearly audible frequency, of means for receiving said waves and variations including a circuit responsive thereto, a detector controlled by said circuit, two circuits tuned to respond selectively to said two series of periodic variations respectively, two thermionic valves controlled by said two circuits respectively, a circuit controlled by the joint action of said valves, and a detector controlled by said last mentioned circuit.

13. In a system of signaling, the combination with means for generating a series of waves having impressed therein two series of periodic variations differing in frequency by a clearly audible frequency, of means for receiving said waves and variations including a circuit responsive thereto, a detector controlled by said circuit, two circuits tuned to respond selectively to said two series of periodic variations respectively, two thermionic valves controlled by said two circuits respectively, a circuit controlled by the joint action of said valves, a detector controlled by said last mentioned circuit, an amplifier controlled by said last mentioned detector and an indicator controlled by said amplifier.

14. A receiving system for signaling, comprising a receiving circuit, a detector controlled by said circuit, two circuits controlled by said detector and tuned respectively to two frequencies differing by a clearly audible frequency, two thermionic valves controlled by said two circuits respectively, a circuit controlled jointly by said valves, and an indicator controlled by said last-mentioned circuit.

15. A receiving system for signaling comprising a receiving circuit, a detector controlled by said circuit, two circuits controlled by said detector and tuned respectively to two frequencies differing by a clearly audible frequency, two thermionic valves controlled by said two circuits respectively, a circuit controlled jointly by said valves, a detector controlled by said last-mentioned circuit, an amplifier controlled by said last-mentioned detector and a receiving device controlled by said amplifier.

16. A receiving system for signaling, comprising a receiving circuit, a detector controlled by said circuit, two, closed, oscillatory circuits tuned to two frequencies respectively, said frequencies differing by a clearly audible frequency, two amplifiers controlled by said two, closed, oscillatory circuits respectively, two, closed, oscillatory circuits controlled by said amplifiers respectively, an untuned circuit controlled by said last-mentioned, two circuits, a detector controlled by said untuned circuit, a circuit controlled by said last-mentioned detector and tuned to said clearly audible frequency, and a receiving device controlled by said last-mentioned circuit.

This application signed this 6th day of July, 1923.

JOHN HAYS HAMMOND, Jr.